(12) United States Patent
Hong (10) Patent No.: US 12,003,696 B2
(45) Date of Patent: Jun. 4, 2024

(54) DISPLAY DEVICE AND DISPLAY METHOD THEREOF

(71) Applicant: BOE TECHNOLOGY GROUP CO., LTD., Beijing (CN)

(72) Inventor: Tao Hong, Beijing (CN)

(73) Assignee: BOE TECHNOLOGY GROUP CO., LTD, Beijing (CN)

(*) Notice: Subject to any disclaimer, the term of this patent is extended or adjusted under 35 U.S.C. 154(b) by 638 days.

(21) Appl. No.: 17/288,586

(22) PCT Filed: Sep. 14, 2020

(86) PCT No.: PCT/CN2020/115125
§ 371 (c)(1),
(2) Date: Apr. 26, 2021

(87) PCT Pub. No.: WO2021/082765
PCT Pub. Date: May 6, 2021

(65) Prior Publication Data
US 2022/0311991 A1    Sep. 29, 2022

(30) Foreign Application Priority Data
Oct. 30, 2019  (CN) .......................... 201911042575.9

(51) Int. Cl.
| H04N 13/307 | (2018.01) |
| G01S 7/20 | (2006.01) |
| G02F 1/01 | (2006.01) |
| H04N 13/32 | (2018.01) |
| H04N 13/324 | (2018.01) |
| G01S 7/04 | (2006.01) |

(52) U.S. Cl.
CPC ............ *H04N 13/307* (2018.05); *G01S 7/20* (2013.01); *G02F 1/0121* (2013.01); *H04N 13/32* (2018.05); *H04N 13/324* (2018.05); *G01S 7/04* (2013.01)

(58) Field of Classification Search
CPC .... H04N 13/307; H04N 13/32; H04N 13/324; G01S 7/20; G01S 7/04; G02F 1/0121
(Continued)

(56) References Cited

U.S. PATENT DOCUMENTS

| 5,311,337 A | 5/1994 | McCartney, Jr. |
| 2008/0117154 A1 | 5/2008 | Yeh |

(Continued)

FOREIGN PATENT DOCUMENTS

| CN | 103886808 A | 6/2014 |
| CN | 103903524 A | 7/2014 |

(Continued)

OTHER PUBLICATIONS

First office action of Chinese application No. 201911042575.9 dated Feb. 2, 2021.
(Continued)

*Primary Examiner* — William Choi
(74) *Attorney, Agent, or Firm* — Lippes Mathias LLP (57) ABSTRACT

Provided is a display device. The display device includes a display panel and a microlens array disposed on a light-emitting side of the display panel, wherein the display panel includes a plurality of pixel islands in which a first pixel island displaying a first color, a second pixel island displaying a second color, and a third pixel island displaying a third color adjacent to one another form a repeating unit. In a same repeating unit, three sub-pixels at the same positions relative to their respective microlens units in the first pixel island, the second pixel island, and the third pixel island are disposed at three vertexes of a triangle respectively, and thus form a color fusion pixel. In addition, the display device further includes microlens arrays in one-to-one correspondence with the plurality of pixel islands to realize 3D display.

20 Claims, 9 Drawing Sheets

(58) Field of Classification Search
USPC .......................................................... 359/242
See application file for complete search history.

(56) References Cited

U.S. PATENT DOCUMENTS

| | | |
|---|---|---|
| 2008/0252558 A1 | 10/2008 | Kim et al. |
| 2016/0027369 A1* | 1/2016 | Guo .................... G09G 3/2003 |
| | | 345/694 |
| 2016/0049110 A1 | 2/2016 | Shi et al. |
| 2019/0139472 A1 | 5/2019 | Liu |
| 2021/0134844 A1 | 5/2021 | Liu |

FOREIGN PATENT DOCUMENTS

| | | | |
|---|---|---|---|
| CN | 105807438 | A | 7/2016 |
| CN | 106531072 | A | 3/2017 |
| CN | 106773081 | A | 5/2017 |
| CN | 107561723 | A | 1/2018 |
| CN | 107783304 | A | 3/2018 |
| CN | 107993580 | A | 5/2018 |
| CN | 110632767 | A | 12/2019 |
| JP | 2005062626 | A | 3/2005 |

OTHER PUBLICATIONS

Second office action of Chinese application No. 201911042575.9 dated Aug. 11, 2021.

* cited by examiner

DISPLAY DEVICE AND DISPLAY METHOD THEREOF

CROSS-REFERENCE TO RELATED APPLICATION

This application is a 371 of PCT Application No. PCT/CN2020/115125, filed on Sep. 14, 2020, which claims priority to Chinese Patent Application No. 201911042575.9, filed on Oct. 30, 2019 and entitled "DISPLAY DEVICE AND DISPLAY METHOD THEREOF", the disclosure of which is herein incorporated by reference in its entirety.

TECHNICAL FIELD

The present disclosure relates to the field of display technologies, and in particular to a display device and a display method thereof.

BACKGROUND

At present, a 3D object displayed by an ordinary 3D display device for naked eyes with binocular parallax is stereoscopic vision formed by displaying different images to left and right eyes of a user respectively. However, a vergence-accommodation conflict in 3D display based on binocular stereo vision causes eye fatigue and dizziness when the user wears the display device for long, which is a problem to be urgently solved in the 3D display device.

SUMMARY

An embodiment of the present disclosure provides a display device and a display method thereof.

According to a first aspect of embodiments of the present disclosure, a display device is provided. The display device includes a display panel and a microlens array disposed on a light-emitting side of the display panel, wherein the display panel includes a plurality of pixel islands, and the microlens array includes a plurality of microlens units in one-to-one correspondence with the plurality of pixel islands; wherein an orthographic projection of each of the microlens units on the display panel is coincident with or disposed within a region where a corresponding pixel island is disposed; and each of the pixel islands includes a plurality of sub-pixels arranged in an array, wherein the sub-pixels in a same pixel island display a same color, and the plurality of pixel islands include a first pixel island displaying a first color, a second pixel island displaying a second color, and a third pixel island displaying a third color, the first pixel island, the second pixel island, and the third pixel island adjacent to one another forming a repeating unit; wherein in a same repeating unit, a first sub-pixel in the first pixel island, a second sub-pixel in the second pixel island, and a third sub-pixel in the third pixel island are disposed at three vertexes of a triangle respectively, wherein the first sub-pixel, the second sub-pixel, and the third sub-pixels are disposed at same positions respectively relative to the microlens unit corresponding to the first pixel island, the microlens unit corresponding to the second pixel island, and the microlens unit corresponding to the third pixel island.

Optionally, in the same repeating unit, the first sub-pixels in the first pixel island, the second sub-pixels in the second pixel island, and the third sub-pixels in the third pixel island are disposed at three vertexes of an isosceles triangle respectively.

Optionally, the pixel island and the microlens unit are both in a rectangular shape.

Optionally, in each of the pixel islands, the number of sub-pixels in a length direction is 2 k, and a ratio of the number of sub-pixels in the length direction to the number of sub-pixels in the width direction is 2i:1, wherein k is an integer greater than or equal to 2, and i is an integer greater than or equal to 1.

Optionally, the length direction is parallel to an extension direction of a grid line.

Optionally, a pitch P of the microlens unit is calculated by the following formula:

$$P=(N\times T\times Px)/(T+Px);$$

a curvature radius r of the microlens unit is calculated by the following formula:

$$r=(Px\times L\times (N-1))/T;$$

a distance h between the microlens unit and the display panel is calculated by the following formula:

$$h=(L\times Px)/T;$$

a thickness d of the microlens unit is calculated by the following formula:

$$d=n\times r/(n-1)-n\times h;$$

a width w of the microlens unit is calculated by the following formula:

$$w=(L\times N\times Px)/(L+h);$$

wherein Px refers to a width of the sub-pixel, n refers to a refractive index of a material of the microlens unit, L refers to a preset viewing distance, T refers to a preset binocular pupil distance, and N refers to the number of viewpoints. The number of viewpoints is also the number of sub-pixels included in each pixel island.

Optionally, the display device further includes a controlling unit and a rendering unit, wherein the controlling unit is electrically connected to the rendering unit and configured to control the rendering unit to perform image rendering, and each sub-pixel in the pixel island is electrically connected to the rendering unit.

According to a second aspect of embodiments of the present disclosure, a display method of a display device is provided. The display method is applicable to the display device as described above. The display method includes:

driving, in each display period, a plurality of rows of pixels included in the display device row by row for display;
wherein each of the pixels includes the first sub-pixel in the first pixel island, the second sub-pixel in the second pixel island, and the third sub-pixel in the third pixel island in the same repeating unit.

Optionally, the each display period includes a plurality of timings, wherein pixels displayed by driving in any two timings are different and multiplex a sub-pixel in at least one of the pixel islands.

Optimally, the each display period includes 2 m, or 3 m, or 6 m timings, wherein m is a positive integer greater than or equal to 1; a refresh rate of an image in each of the timings is greater than F, wherein F is a refresh rate when human eyes are incapable of perceiving image flicker.

Optionally, the each display periods includes a first timing, a second timing, and a third timing;
wherein a first pixel displayed by driving in the first timing and a second pixel displayed by driving in the second timing multiplex a sub-pixel in at least one of the pixel islands, the second pixel and a third pixel displayed by driving in the third timing multiplex a sub-pixel in at least one of the pixel islands, and the first pixel, the second pixel and the third pixel are arranged along a direction parallel to a grid line.

Optionally, the each display period includes a first timing and a second timing;
wherein a first pixel displayed by driving in the first timing and a second pixel displayed by driving in the second timing multiplex a sub-pixel in at least one of the pixel islands, and the first pixel and the second pixel are arranged along a direction parallel to a data line.

Optionally, the each display period includes a first timing, a second timing, a third timing, a fourth timing, a fifth timing, and a sixth timing;
wherein a first pixel displayed by driving in the first timing and a second pixel displayed by driving in the second timing multiplex a sub-pixel in at least one of the pixel islands, the second pixel and a third pixel displayed by driving in the third timing multiplex a sub-pixel in at least one of the pixel islands, and the first pixel, the second pixel, and the third pixel are arranged along a direction parallel to a grid line;
a fourth pixel displayed by driving in the fourth timing and a fifth pixel displayed by driving in the fifth timing multiplex a sub-pixel in at least one of the pixel islands, the fifth pixel and a sixth pixel displayed by driving in the sixth timing multiplex a sub-pixel in at least one of the pixel islands, and the fourth pixel, the fifth pixel and the sixth pixel are arranged along the direction parallel to the grid line;
the first pixel and the fourth pixel multiplex a sub-pixel in at least one of the pixel islands, and are arranged along a direction parallel to a data line;
the second pixel and the fifth pixel multiplex a sub-pixel in at least one of the pixel islands, and are arranged along the direction parallel to the data line; and
the third pixel and the sixth pixel multiplex a sub-pixel in at least one of the pixel islands, and are arranged along the direction parallel to the data line.

According to a third aspect of embodiments of the present disclosure, another display method of a display device is provided. The display method is applicable to the display device as described above. The display method includes:
driving, in each display period, a plurality of rows of pixels included in the display device row by row for display;
wherein each of the pixels includes the first pixel island, the second pixel island, and the third pixel island adjacent to one another, and each sub-pixel in each of the pixel islands has a same gray scale.

Optionally, the each display periods includes a plurality of timings, wherein pixels displayed by driving in any two timings are different and multiplex a sub-pixel in at least one of the pixel islands.

Optionally, the each display period includes 2 m, or 3 m, or 6 m timings, wherein m is a positive integer greater than or equal to 1; a refresh rate of an image in each of the timings is greater than F, wherein F is a refresh rate when human eyes are incapable of perceiving image flicker.

Figure 1:
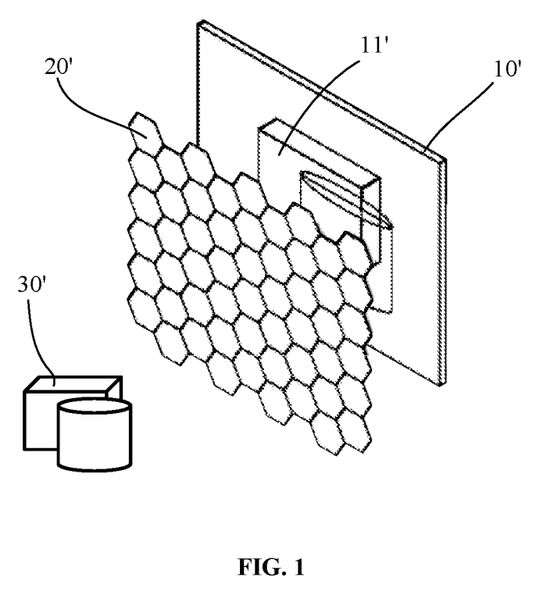
FIG. 1 is a schematic diagram of imaging of a 3D display system of integrated imaging in the related art.
Figure 2:
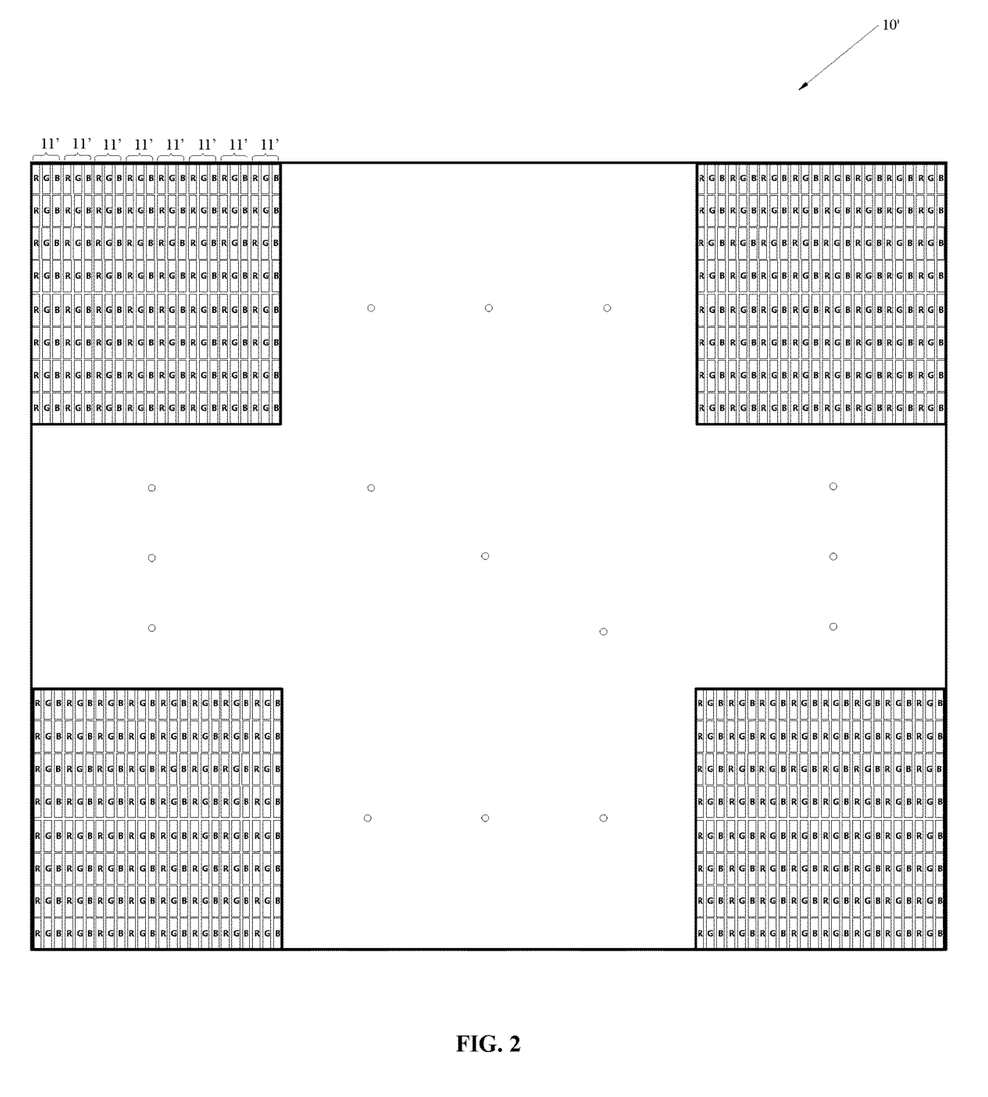
FIG. 2 is a structural schematic diagram of a display panel in the related art.

Numerals of FIG. 1 and FIG. 2 are described as follows:
display panel 10'
pixel 11'
microlens array 20'
3D display object 30'
Numerals of FIG. 3 to FIG. 9 are described as follows:
display panel 10
first pixel island 11
second pixel island 12
third pixel island 13
fusion pixel 14
microlens array 20
first microlens unit 21
second microlens unit 22
third microlens unit 23
controlling unit 40
rendering unit 50

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The embodiments set forth in the following description of exemplary embodiments do not represent all embodiments consistent with the present disclosure. Instead, they are merely examples of devices consistent with some aspects related to the present disclosure as recited in the appended claims.

The terms used in the present disclosure are merely for the purpose of describing particular embodiments, and are not intended to limit the present disclosure. Unless otherwise defined, technical terms or scientific terms used in the present disclosure shall be of ordinary meanings as understood by those of ordinary skill in the art to which the present disclosure pertains. The term "a" or "an" or a similar term used in the specification of the present disclosure and the claims denotes at least one, instead of limitation to quantity. The term "comprise" or "include" or a similar term is intended to mean that elements or items which appear before the term "comprise" or "include" cover the elements or items listed after the term "comprise" or "include" and their equivalents, without excluding other elements or items. The term "connection" or "connected" or a similar term is not limited to physical or mechanical connection, and may include electrical connection, and the connection may be direct or indirect. The term "at least one" refers to one or more than one, and the term "a plurality of" refers to two or more than two. The singular forms of "a/an", "the" and "said" used in the specification of the present disclosure and the appended claims are also intended to include plural forms unless the context clearly indicates other meanings. It is also to be understood that the term "and/or" as used herein indicates that there may be three relationships; for example, A and/or B may indicate three cases that A exists alone, A and B exist concurrently, and B exists alone. The symbol "/" generally indicates that the context object is an "or" relationship.

At present, optical field display provides a feasible method for solving eye fatigue and dizziness of a user, in which natural 3D display is realized by simulating an optical field of a natural 3D object, thereby reducing fatigue and dizziness of human eyes. The method for realizing optical field display mainly includes integrated imaging display adopting a microlens array, in addition to holographic display. As shown in FIG. 1, a layer of microlens array may be superimposed in front of a display element to render an image displayed by integrated imaging on the display element and control light in each direction by using the microlens array, so as to form the natural 3D display.

As shown in FIG. 1, in a 3D display system of integrated imaging, information carried by pixels 11' on a display panel 10' is imaged by a microlens in a microlens array 20' to become a 3D display object 30' in a display space. In the general 3D display system of integrated imaging, one microlens corresponds to a plurality of pixels including red sub-pixels (R sub-pixels), green sub-pixels (G sub-pixels), and blue sub-pixels (B sub-pixels). FIG. 2 illustrates a display panel 10' in the related art, in which one microlens corresponds to 8×8 pixels 11'. Each pixel 11' is formed by three sub-pixels (R, G and B sub-pixels), such that the size of one microlens corresponds to 24 sub-pixels in a length direction and 24 sub-pixels in a width direction. The 8×8 pixels 11' form a 3D image unit, and each pixel 11' corresponds to one light direction, such that 8×8 pixels form 64 light directions, that is, 8×8 pixels provide 64 viewpoints.

As a resolution of the 3D image of integrated imaging depends on the size of the microlens, it is required to reduce the size of the microlens to increase the resolution of the 3D image. However, the reduced size of the microlens is incapable of ensuring the number of viewpoints, thereby affecting a stereo effect of 3D display of the optical field. At present, the microlens of integrated imaging display in an ordinary RGB pixel arrangement is relatively large in size (corresponding to 24×24 sub-pixels as described above) and low in 3D resolution, thereby failing to satisfy visual requirements of human eyes. Therefore, on the basis of ensuring that there are enough viewpoints for realizing the 3D display of the optical field, how to increase the resolution of 3D display imaging is a problem to be solved in the art.

Figure 3:
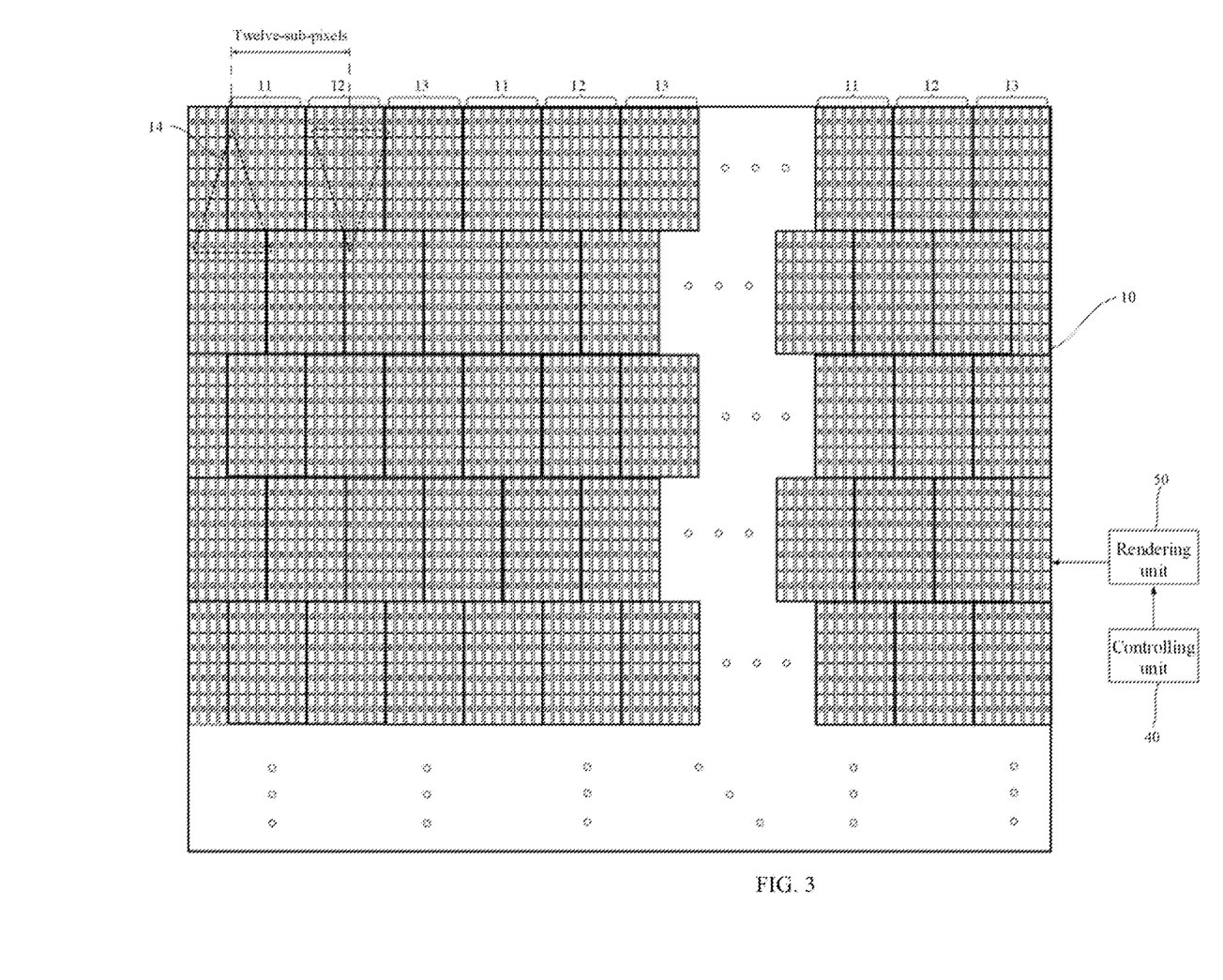
FIG. 3 is a structural schematic diagram of a display panel according to an embodiment of the present disclosure.
Figure 4:
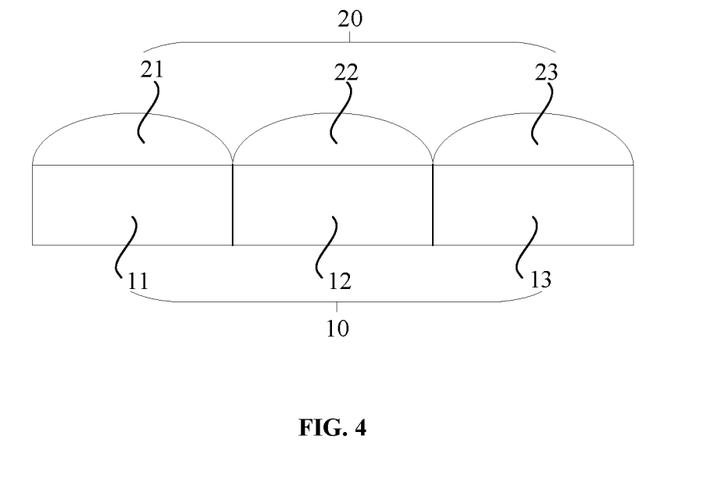
FIG. 4 is a structural schematic diagram of another display panel according to an embodiment of the present disclosure.

In combination with FIG. 3 and FIG. 4, an embodiment of the present disclosure provides a display device. The display device includes a display panel 10 and a microlens array 20 disposed on a light-emitting side of the display panel 10 (not shown in FIG. 3). The display panel 10 includes a plurality of pixel islands, and the microlens array 20 includes a plurality of microlens units in one-to-one correspondence with the pixel islands. An orthographic projection of each of the microlens units on the display panel 10 is coincident with or disposed within a region where a corresponding pixel island is disposed. That is, the size of each microlens unit may be less than or equal to the size of the corresponding pixel island.

Each of the pixel islands includes a plurality of sub-pixels arranged in an array, wherein the sub-pixels in a same pixel island display a same color. The pixel islands include a first pixel island 11 displaying a first color, a second pixel island 12 displaying a second color, and a third pixel island 13 displaying a third color. Correspondingly, as shown in FIG. 4, the microlens array 20 includes a first microlens unit 21 corresponding to the first pixel island 11, a second microlens unit 22 corresponding to the second pixel island 12, and a third microlens unit 23 corresponding to the third pixel island 13.

The first pixel island 11, the second pixel island 12, and the third pixel island 13 adjacent to one another form a repeating unit. In a same repeating unit, a first sub-pixel in the first pixel island 11, a second sub-pixel in the second pixel island 12, and a third sub-pixel in the third pixel island 13 are disposed at three vertexes of a triangle respectively. In addition, the first sub-pixel, the second sub-pixel, and the third sub-pixels are disposed at same positions respectively relative to the microlens unit corresponding to the first pixel island 11, the microlens unit corresponding to the second pixel island 12, and the microlens unit corresponding to the third pixel island 13.

Figure 5:
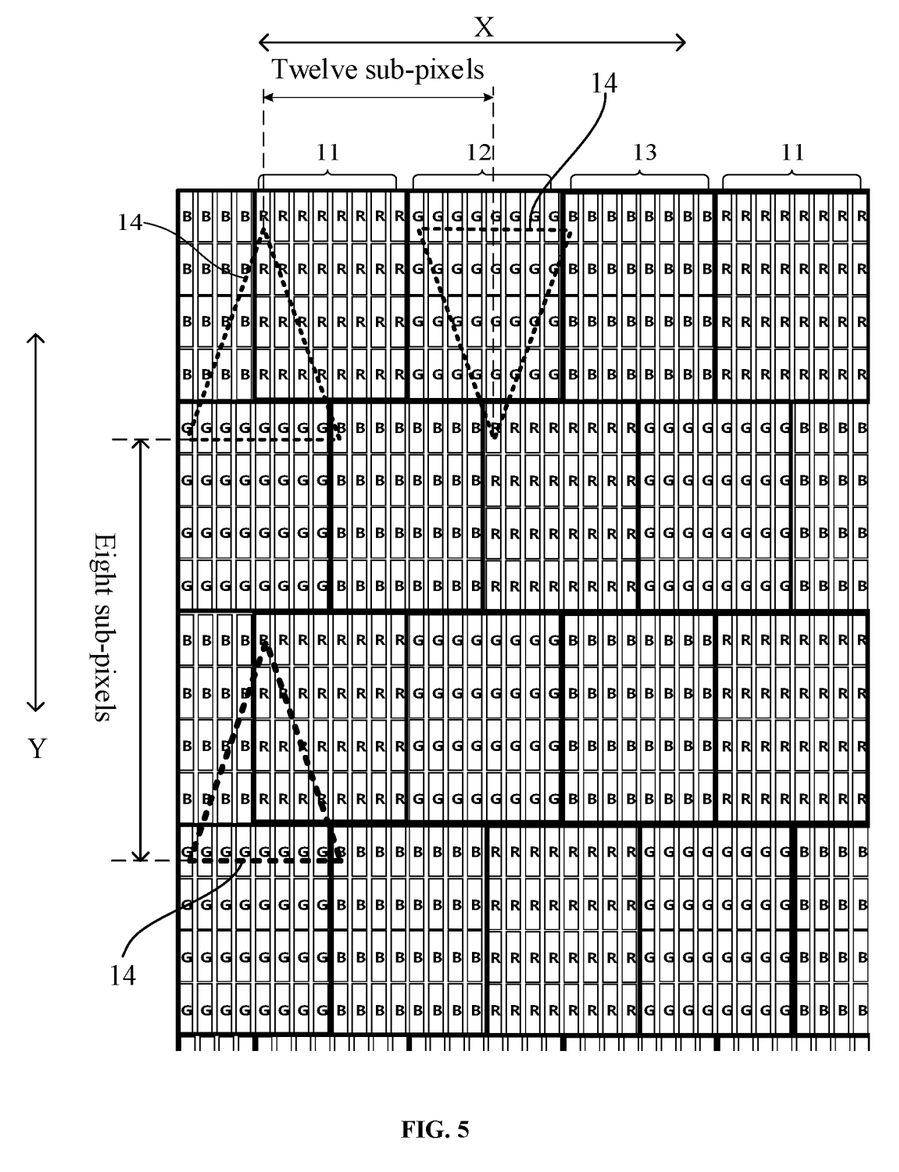
FIG. 5 is a partial structural schematic diagram of a display panel according to an embodiment of the present disclosure.

FIG. 5 is a partial structural schematic diagram of a display panel according to an embodiment of the present disclosure. As shown in FIG. 5, a first color displayed by the first pixel island 11 is red (R), a second color displayed by the second pixel island 12 is green (G), and a third color displayed by the third pixel island 13 is blue (B). In addition, a first sub-pixel R in the first row and first column of the first pixel island 11, a first sub-pixel G in the first row and first column of the second pixel island 12, and a first sub-pixel B in the first row and first column of the third pixel island 13 are disposed at three vertexes of a triangle respectively.

That is, each of the pixel islands corresponds to one microlens unit for control of a light beam direction, each sub-pixel in the pixel island corresponds to the light in one direction, and the display panel 10 and the microlens array work together to realize 3D display of integrated imaging. Based on the arrangement in which the first pixel island 11, the second pixel island 12, and the third pixel island 13 are adjacent to one another in the repeating unit and the disposal that three sub-pixels at the same positions relative to their respective microlens units in the first pixel island 11, the second pixel island 12, and the third pixel island 13 in the same repeating unit are disposed at three vertexes of the triangle respectively, the 3D image in a plurality of viewpoint directions can be formed in the length direction, thereby increasing the resolution of integrated imaging. In addition, based on the arrangement in which the first pixel island 11, the second pixel island 12, and the third pixel island 13 are adjacent to one another in the repeating unit, the size of the microlens can be reduced, and an impact of the 3D display device on the resolution of 2D display can be improved.

Optionally, referring to FIG. 5, in each of the pixel islands, the number of sub-pixels in a length direction X is 2 k, and a ratio of the number of sub-pixels in the length direction X to the number of sub-pixels in a width direction Y is 2i:1, wherein k is an integer greater than or equal to 2, and i is an integer greater than or equal to 1. That is, in each of the pixel islands, the minimum number of the sub-pixels in the length direction X is 4, and the minimum number of the sub-pixels in the width direction Y is 2, such that there are at least more than 8 sub-pixels in each of the pixel islands to form a 3D image of at least 4 viewpoints in the length direction and at least 2 viewpoints in the width direction. For example, in the embodiments of FIG. 3 and FIG. 5, in each of the pixel islands, the number of the sub-pixels in the length direction is 8, and the number of sub-pixels in the width direction is 4, that is, each of the pixel islands includes 8×4 sub-pixels.

In some embodiments of the present disclosure, the length direction X may be parallel to an extension direction of a grid line, and the width direction Y may be parallel to an extension direction of a data line.

In the related art, in the case that ordinary RGB sub-pixels are distributed and arranged sequentially, the minimum interval of color films is the size of one sub-pixel. Based on this, if the resolution of the color film is to be increased, the manufacturing of the color film may become more difficult, and a yield rate may be affected. In this embodiment, the minimum interval of color films is the size of one monochromatic pixel island. In addition, as the number of sub-pixels in the monochromatic pixel island is greater than 8, the color film can be manufactured in a larger unit size, thereby reducing manufacturing process requirements of the color film, improving the yield rate, and further reducing the manufacturing difficulty of increasing the resolution of the color film.

The size and shape of the microlens unit are both consistent with those of the pixel island. The pixel island and the microlens unit are both in a rectangular shape. The microlens array serves to control a light direction. It should be understood that, in addition to rectangular, the pixel island and the microlens unit may also be in other shapes, such as circular, diamond, or orthohexagonal or the like.

Optionally, a pitch P of the microlens unit is calculated by the following formula:

$$P=(N \times T \times Px)/(T+Px);$$

a curvature radius r of the microlens unit is calculated by the following formula:

$$r=(Px \times L \times (N-1))/T;$$

a distance h between the microlens unit and the display panel (which may also be referred to as a placement height of the microlens unit) is calculated by the following formula:

$$h=(L \times Px)/T;$$

a thickness d of the microlens unit is calculated by the following formula:

$$d=n \times r/(n-1)-n \times h;$$

a width w of the microlens unit is calculated by the following formula:

$$w=(L \times N \times Px)/(L+h);$$

wherein Px refers to a width of the sub-pixel, n refers to a refractive index of a material of the microlens unit, L refers to a preset viewing distance, T refers to a preset binocular pupil distance, and N refers to the number of sub-pixels included in each of the pixel islands, which may also be referred to as the number of viewpoints.

It should be understood that the width direction of the sub-pixel is parallel to the width direction of the microlens unit, and parallel to the extension direction of the grid line. In addition, a ratio of the length to the width of each sub-pixel may be 3:1. The above distance h between the microlens unit and the display panel may refer to a distance between an optical center of the microlens and a light-emitting surface of the display panel. The optical center of the microlens may also be understood as the center of the microlens. The above preset viewing distance L may be determined according to an application scenario of the display device. For example, if the display device is a mobile phone, the preset viewing distance L may be in a value range of 200 mm to 350 mm. If the display device is a television, the preset viewing distance L may be in a value range of 1 m to 3 m. The preset binocular pupil distance T may be in a value range of 55 mm to 75 mm, for example, an average value of 65 mm.

Optionally, in the same repeating unit, the first sub-pixel in the first pixel island 11, the second sub-pixel in the second pixel island 12, and the third sub-pixel in the third pixel island 13 are disposed at three vertexes of an isosceles triangle respectively.

It may be seen from FIG. 3 and FIG. 5 that the first pixel island 11, the second pixel island 12, and the third pixel island 13 adjacent to one another in the repeating unit are distributed in two adjacent rows and arranged staggeredly. Therefore, when the first pixel island 11 in the upper row is disposed in the middle of the second pixel island 12 and the third pixel island 13 disposed at the corresponding position in the lower row, three sub-pixels at the same positions relative to their respective microlens units in the first pixel island 11, the second pixel island 12 and the third pixel island 13 are disposed at three vertexes of the isosceles triangle respectively, so as to facilitate manufacturing of the display panel.

Optionally, the display device further includes a controlling unit 40 and a rendering unit 50, wherein the controlling unit 40 is electrically connected to the rendering unit 50 and configured to control the rendering unit 50 to perform image rendering, and each sub-pixel in the pixel island is electrically connected to the rendering unit 50.

The rendering unit 50 may be a graphics processing unit (GPU) or a central processing unit (CPU). In addition, the rendering unit 50 may be connected to each sub-pixel by a driving circuit (such as, a source driving circuit). The controlling unit 40 may be a CPU. In embodiments of the present disclosure, the rendering unit 50 and the controlling unit 40 may be disposed independently, or integrated.

Referring to FIG. 3 and FIG. 5 again, in this embodiment, the display panel 10 is a panel with RGB sub-pixels of 8K (7680×4320), and the number of sub-pixels in the length direction in the entire display panel 10 is actually 7680×3. In the display panel 10, the sizes of the first pixel island 11, the second pixel island 12, and the third pixel island 13 are all set to 8×4 monochromatic sub-pixels, which represents that an image in 8×4=32 directions may be rendered. That is, 8 viewpoints in the length direction (which is also referred to as a transverse direction) and 4 viewpoints in the width direction (which is also referred to as a longitudinal direction) totally form 32 viewpoints for 3D display of integrated imaging.

In each repeating unit, three RGB sub-pixels forming a color fusion pixel of one viewpoint are three sub-pixels at the same positions relative to their respective microlens units in the first pixel island 11 displaying red, the second pixel island 12 displaying green, and the third pixel island 13 displaying blue. The three RGB sub-pixels are disposed at three vertexes of the triangle, and color fusion pixels of the entire display panel 10 together form a 3D color image of each viewpoint. In addition, the three RGB sub-pixels in the color fusion pixel disposed at three vertexes of the triangle can ensure the sizes of the color fusion pixel formed in the display panel in the transverse and longitudinal directions to be more balanced.

At this time, as shown in FIG. 5, a distance between two adjacent color fusion pixels 14 in the length direction X is the width of twelve sub-pixels, and a distance between two adjacent color fusion pixels 14 in the width direction Y is the length of eight sub-pixels, such that the realizable resolution of the 3D image in the length direction X is 7680*3/12=1960, and the realizable resolution of the 3D image in the width direction Y is 4320/8=540.

In the related art in which ordinary RGB sub-pixels of the display panel 10 are arranged at intervals, each microlens corresponds to 8×8 pixels, and has eight viewpoints in the length direction and eight viewpoints in the width direction. The realizable resolution of the 3D image in the length direction is 7680/8=960, and the realizable resolution of the 3D image in the width direction is 4320/8=540.

It may be seen that the 3D image of the present disclosure has the higher resolution in the length direction in the case of the same number of viewpoints in the length direction. It should be explained that human eyes are generally more sensitive to the increased resolution in the length direction. Therefore, the increase of the resolution in the length direction has a greater effect on the increase of the resolution in the overall vision.

Based on the same inventive concept, an embodiment of the present disclosure provides a display method of a display device. The display method includes:

driving, in each display period, a plurality of rows of pixels included in the display device row by row for display.

Each of the pixels includes the first sub-pixel in the first pixel island, the second sub-pixel in the second pixel island, and the third sub-pixel in the third pixel island in the same repeating unit.

An image displayed by using the display method is a 3D image. In this way, the controlling unit controls the rendering unit to render sub-pixels in the pixel island of the repeating unit according to the corresponding gray scale, so as to form an image in different directions, that is, a 3D image of integrated imaging.

Further, in the display method according to an embodiment of the present disclosure, the sub-pixels in the pixel island can be multiplexed for display by adopting time division multiplexing, so as to further increase the resolution of 3D image display.

Optionally, the each display period may include a plurality of timings, wherein pixels displayed by driving in any two timings are different and multiplex a sub-pixel in at least one of the pixel islands.

Exemplarily, the each display period may include 2 m, or 3 m, or 6 m timings, wherein m is a positive integer greater than or equal to 1. In addition, a refresh rate of an image in each of the timings is greater than F, wherein F is a refresh rate when human eyes are incapable of perceiving image flicker. As the refresh rate when human eyes are incapable of perceiving image flicker is generally greater than 30 Hz, the F may be greater than or equal to 30 Hz. At the same time, in order to correctly display the required image by the display device, the controlling unit controls the rendering unit to render the 3D image in a correct timing and further display the 3D image on the display panel.

Figure 6:
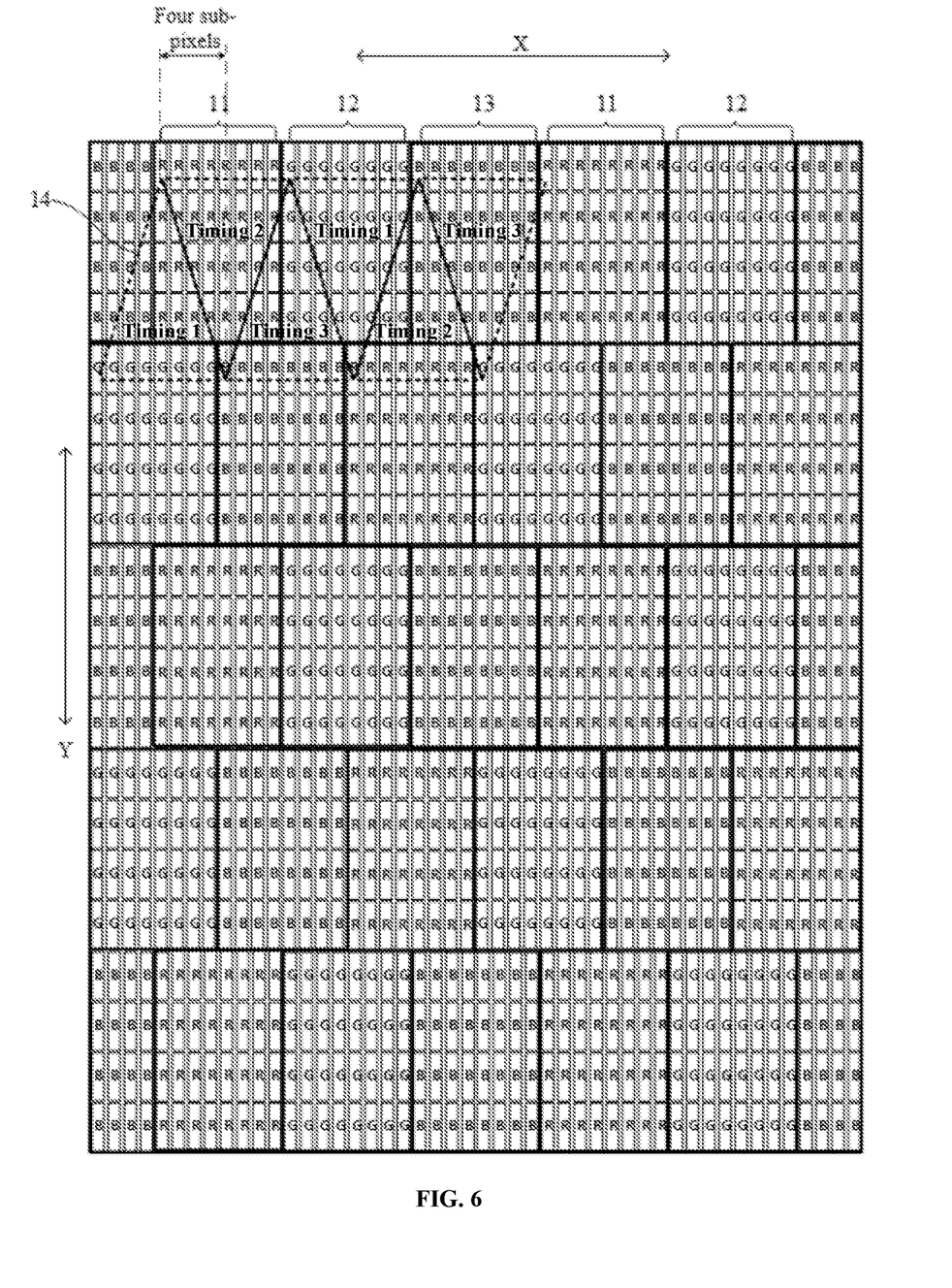
FIG. 6 is a partial display schematic diagram of a display panel in another method for displaying a 3D image according to an embodiment of the present disclosure.

In an optional implementation, FIG. 6 is a partial display schematic diagram of a display panel 10 in another method for displaying a 3D image according to this embodiment. In the display method, the resolution of 3D display in the length direction X may be further increased by using a method for performing time division multiplexing for adjacent sub-pixels. In this implementation, the each display period includes a total of three timings including a first timing, a second timing, and a third timing. A first pixel displayed by driving in the first timing and a second pixel displayed by driving in the second timing multiplex a sub-pixel in at least one of the pixel islands, the second pixel and a third pixel displayed by driving in the third timing multiplex a sub-pixel in at least one of the pixel islands, and the first pixel, the second pixel, and the third pixel are arranged along a direction parallel to a grid line (that is, the length direction X).

In this embodiment, the display panel 10 with high refresh rate may be adopted in the arrangement in which the first pixel island 11, the second pixel island 12 and the third pixel island 13 are adjacent to one another in the repeating unit, and the resolution of 3D display in the length direction X can be further increased by using the method for performing time division multiplexing for adjacent sub-pixels based on the pixels arranged along the length direction X.

It may be seen from FIG. 6 that if the first timing is a timing 1 and the second timing is a timing 2, the same R, G and B sub-pixels are multiplexed in the time sequence 1 and the time sequence 2. For example, in a left-to-right order, the first timing (a first of a first pixel in the timing 1) shares R and B sub-pixels with the second sequence (a first of a second pixel in the timing 2). The first of the second pixel in the timing 2 also shares a G sub-pixel with a second of the first pixel in the timing 1. It should be understood that for two adjacent pixels, the first of the first pixel in the timing 1 shares R and B sub-pixels with the first of the second pixel in the timing 2, but the two adjacent pixels do not share a G sub-pixel. That is, in an image with adjacent timings, two spatially adjacent pixels share part of the first sub-pixels in the first pixel island 11, the second sub-pixels in the second pixel island 12, and the third sub-pixels in the third pixel island 13 to realize time division multiplexing, and increase the resolution.

Similarly, as shown in FIG. 6, if the third timing is a timing 3, R, B and G sub-pixels are multiplexed in the timing 2 and the timing 3, and R, G and B sub-pixels are multiplexed in the timing 1 and the timing 3. For example, a first of a third pixel in the timing 3 shares G and B sub-pixels with the first of the second pixel in the timing 2, and shares an R sub-pixel with a second of the second pixel in the timing 2. The first of the third pixel in the timing 3 also shares G and R sub-pixels with the second of the first pixel in the timing 1. It may be seen from FIG. 6 that the first pixel, the second pixel, and the third pixel described above are arranged along the length direction X.

If each of the pixel islands in the display panel includes 8×4 monochromatic sub-pixels, the controlling unit controls the rendering unit perform the corresponding rendering for the 3D image in different timings respectively. In this way, the distance between two adjacent color fusion pixels in the final length direction X is four sub-pixels after multiplexing, such that the resolution in the length direction is increased by three times compared with the case without multiplexing. As one display period includes three timings, the refresh rate of the display panel 10 is required to be at least 90 Hz at this time to ensure that the refresh rate of each timing is not less than 30 Hz and prevent image flicker during viewing.

Figure 7:
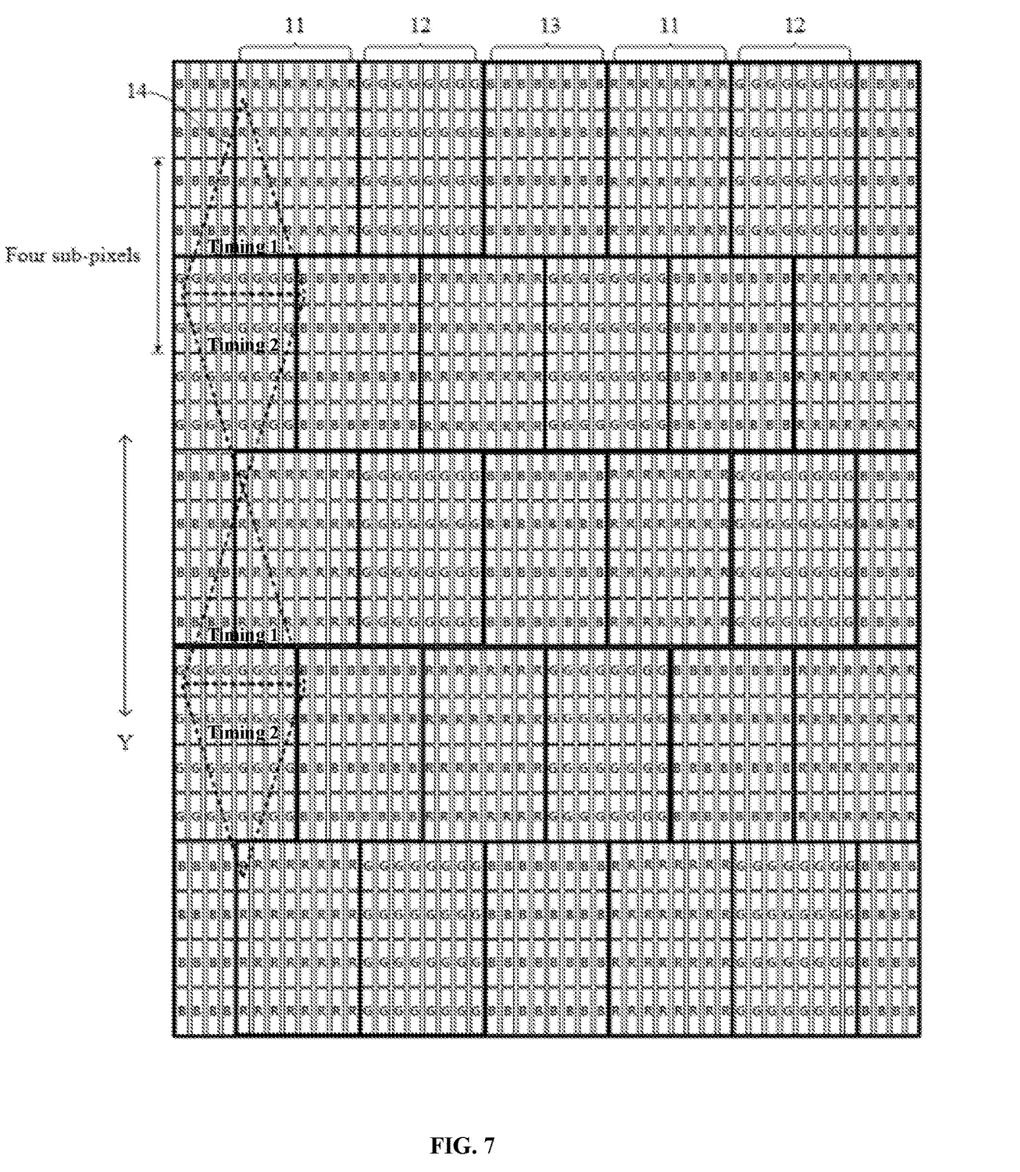
FIG. 7 is a partial display schematic diagram of a display panel in still another method for displaying a 3D image according to an embodiment of the present disclosure.

In another optional implementation, FIG. 7 is a partial display schematic diagram of a display panel 10 in still another method for displaying a 3D image according to this embodiment. In the display method, the resolution of 3D display in the width direction Y may be further increased by using the method for performing time division multiplexing for adjacent sub-pixels. In this implementation, each display period includes a total of two timings, that is, a first timing and a second timing. A first pixel displayed by driving in the first timing and a second pixel displayed by driving in the second timing multiplex sub-pixels in one or two pixel islands, and the first pixel and the second pixel are arranged along a direction parallel to a data line (that is, the width direction Y).

In this embodiment, the display panel 10 with high refresh rate may be adopted in the arrangement in which the first pixel island 11, the second pixel island 12, and the third pixel island 13 are adjacent to one another in the repeating unit, and the resolution of 3D display in the width direction Y can be further increased by using the method for performing time division multiplexing for adjacent sub-pixels based on the pixels arranged along the width direction Y.

It may be seen from FIG. 7 that the same R, G and B sub-pixels are multiplexed in the timing 1 and the timing 2. For example, a first of a first pixel in the timing 1 and a first of a second pixel in the timing 2 multiplex G and B sub-pixels, and the first of the second pixel in the timing 2 and a second of the first pixel in the timing 1 also multiplex an R sub-pixel. In addition, the first pixel and the second pixel described above are arranged along the width direction Y.

If each of the pixel islands in the display panel includes 8×4 monochromatic sub-pixels, the controlling unit controls the rendering unit to perform the corresponding rendering for the 3D image in different timings respectively. In this way, the distance between two adjacent color fusion pixels in the final width direction Y is four sub-pixels after multiplexing, such that the resolution in the width direction Y is increased by twice compared with the case without multiplexing. As one display period includes two timings, the refresh rate of the display panel 10 is required to be at least 60 Hz at this time to ensure that the refresh rate of each timing is not less than 30 Hz and prevent the image flicker during viewing.

Figure 8:
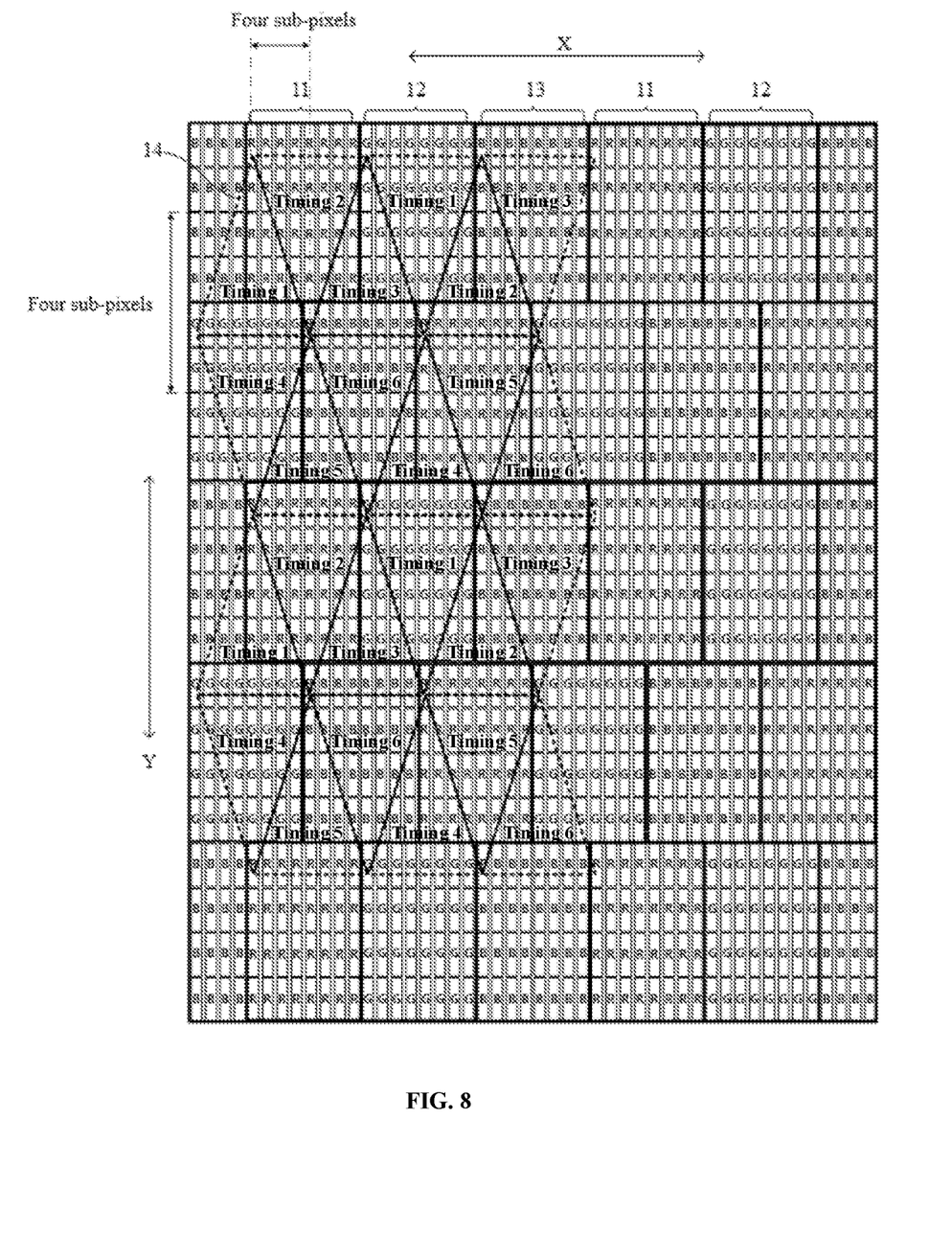
FIG. 8 is a partial display schematic diagram of a display panel in yet another method for displaying a 3D image according to an embodiment of the present disclosure.

In still another optional implementation, FIG. 8 is a partial display schematic diagram of a display panel 10 in still another method for displaying a 3D image according to this embodiment. In the display method, in order to increase the resolutions of 3D display in the length direction X and the width direction X simultaneously, sub-pixels arranged in the length direction and sub-pixels arranged in the width direction are multiplexed simultaneously by adopting time division multiplexing. In this embodiment, each display period includes a total of six timings including a first timing, a second timing, a third timing, a fourth timing, a fifth timing, and a sixth timing.

A first pixel displayed by driving in the first timing and a second pixel displayed by driving in the second timing multiplex a sub-pixel in at least one of the pixel islands, the second pixel and a third pixel displayed by driving in the third timing multiplex a sub-pixel in at least one of the pixel islands, and the first pixel, the second pixel, and the third pixel are arranged along a direction parallel to a grid line.

A fourth pixel displayed by driving in the fourth timing and a fifth pixel displayed by driving in the fifth timing multiplex a sub-pixel in at least one of the pixel islands, the fifth pixel and a sixth pixel displayed by driving in the sixth timing multiplex a sub-pixel in at least one of the pixel islands, and the fourth pixel, the fifth pixel and the sixth pixel are arranged along the direction parallel to the grid line.

The first pixel and the fourth pixel described above also multiplex a sub-pixel in at least one of the pixel islands, and are arranged along a direction parallel to a data line; the second pixel and the fifth pixel described above also multiplex a sub-pixel in at least one of the pixel islands, and are arranged along the direction parallel to the data line; the third pixel and the sixth pixel described above also multiplex a sub-pixel in at least one of the pixel islands, and are arranged along the direction parallel to the data line.

For example, as shown in FIG. 8, a first of a first pixel in the timing 1 shares R and B sub-pixels with a first of a second pixel in the timing 2. The first of the second pixel in the timing 2 also shares B and G sub-pixels with a first of a third pixel in the timing 3. The first of the first pixel in the timing 1 shares B and G sub-pixels with a first of a fourth pixel in the timing 4. The first of the second pixel in the timing 2 shares a B sub-pixel with a first of a fifth pixel in the timing 5. The first of the third pixel in the timing 3 shares R and B sub-pixels with a first of a sixth pixel in the timing 6. The first pixel, the second pixel, and the third pixel described above are arranged along the length direction X, and the fourth pixel, the fifth pixel, and the sixth pixel described above are also arranged along the length direction X. In addition, the first pixel and the fourth pixel described above are arranged along the width direction Y, the second pixel and the fifth pixel described above are arranged along the width direction Y, and the third pixel and the sixth pixel described above are also arranged along the width direction Y.

In this embodiment, the display panel 10 with high refresh rate may be adopted in the arrangement in which the first pixel island 11, the second pixel island 12, and the third pixel island 13 are adjacent to one another in the repeating unit, and the resolutions of 3D display in the length direction X and the width direction Y can be increased by using the method for performing time division multiplexing for adjacent sub-pixels based on the pixels arranged along the length direction X and performing time division multiplexing for adjacent sub-pixels based on the pixels arranged along the width direction Y.

In the display method according to an embodiment of the present disclosure, R, G and B sub-pixels are multiplexed in the timing 1, the timing 2, the timing 3, the timing 4, the timing 5, and the timing 6, and the controlling unit controls the rendering unit to perform the corresponding rendering for the 3D image in different timings respectively. In this way, the distances between two adjacent color fusion pixels in the final length direction X and the final width direction Y are both four sub-pixels after multiplexing, such that the resolution in the length direction is increased by three times and the resolution in the width direction is increased by twice, compared with the case without multiplexing. As one display period includes six timings, the refresh rate of the display panel 10 is required to be at least 180 Hz at this time to ensure that the refresh rate of each timing is not less than 30 Hz and prevent the image flicker during viewing.

According to a third aspect of 8 embodiments of the present disclosure, another display method of a display device is provided. The display method is applied to the display device as described above. The display method includes:

driving, in each display period, a plurality of rows of pixels included in the display device row by row for display.

Each of the pixels includes the first pixel island, the second pixel island, and the third pixel island adjacent to one another, and each sub-pixel in each of the pixel islands has a same gray scale.

That is, in this embodiment, based on the arrangement in which the first pixel island 11, the second pixel island 12, and the third pixel island 13 are adjacent to one another in the repeating unit without adopting a 2D/3D switching element (such as a liquid crystal lens and a birefringent lens), the controlling unit controls the rendering unit to enable sub-pixels in the first pixel island, the second pixel island, and the third pixel island in the repeating unit to display the same gray scale, such that the first pixel island, the second pixel island, and the third pixel island together form a color pixel and the entire display device may display a 2D image.

Further, in another method for displaying a 2D image of the present disclosure, the pixel islands are multiplexed for display by time division multiplexing to further increase the resolution of 2D image display, thereby alleviating a problem that the resolution of 2D display is degraded by using 3D display of the microlens array. In the ordinary 3D display based on the microlens array, the resolution of 2D display is degraded due to the pixels of the 2D image being affected by the size of the microlens.

Optionally, the each display period may include a plurality of timings, wherein pixels displayed by driving in any two timings are different and multiplex a sub-pixel in at least one of the pixel islands.

Figure 9:
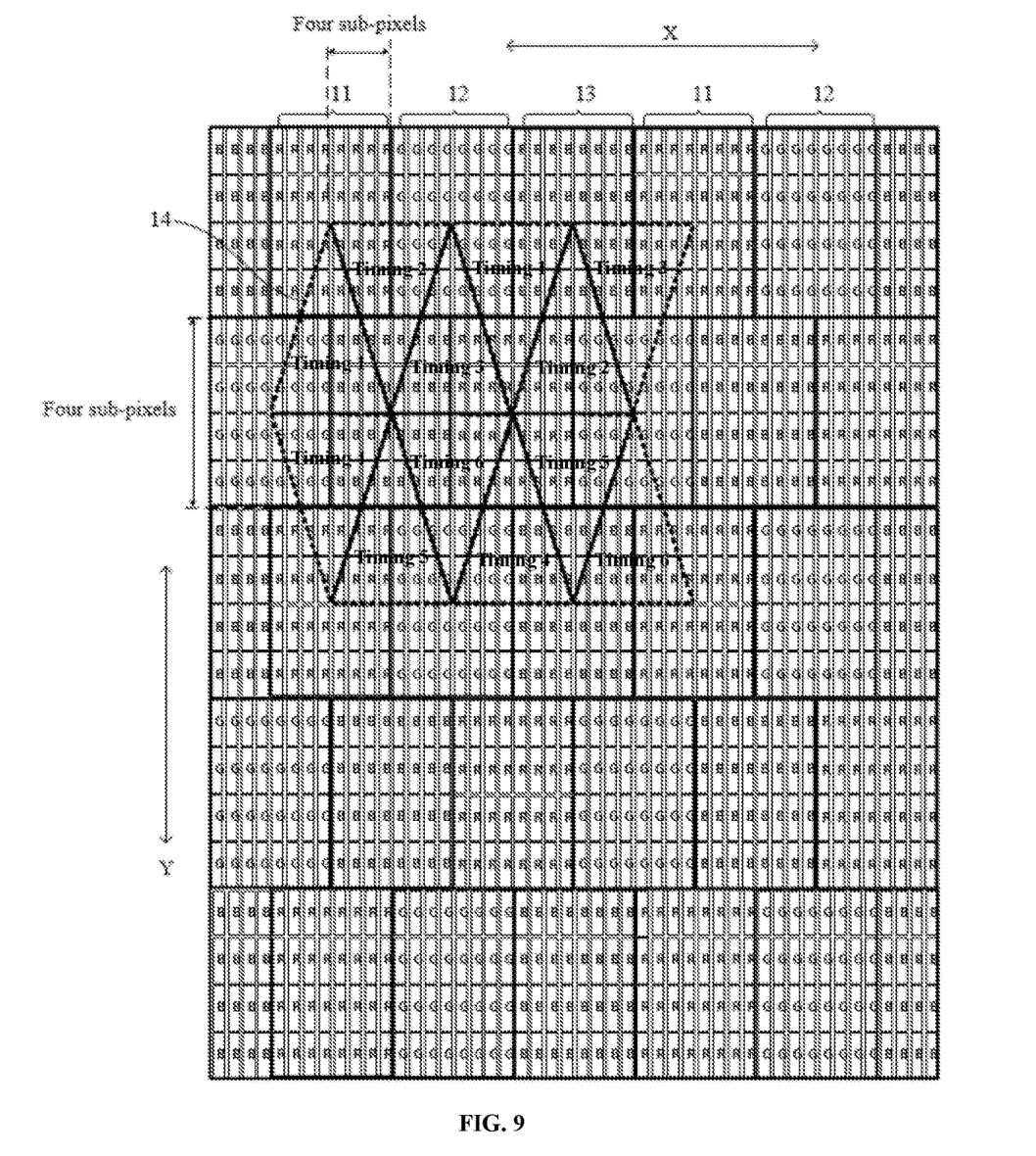
FIG. 9 is a partial display schematic diagram of a display panel in another method for displaying a 2D image according to an embodiment of the present disclosure.

Specifically, the same display period includes 2 m, or 3 m or 6 m timings, wherein m is a positive integer greater than or equal to 1; a refresh rate of an image in each of the timings is greater than F, wherein F is a refresh rate when human eyes are incapable of perceiving image flicker. As shown in FIG. 9, R, G and B pixel islands are multiplexed in the timing 1 to the timing 6 with a principle as described above, which is not repeated herein. In an image with adjacent timings, two spatially adjacent pixels share part of the first pixel island 11, the second pixel island 12, and the third pixel island 13 to realize time division multiplexing, and increase the resolution. For example, in FIG. 9, a first pixel in the timing 1 shares the first pixel island 11 and the third pixel island 13 with the first pixel in the timing 2, and shares the second pixel island 12 and the third pixel island 13 with the first pixel in the timing 4. The first pixel in the timing 2 also shares the second pixel island 12 and the third pixel island 13 with the first pixel in the timing 3, and shares the third pixel island 13 with the first pixel in the timing 5.

The controlling unit controls the rendering unit to perform the corresponding rendering for the 3D image in different timings respectively, such that the resolution of 2D image display is increased.

As one display period includes six timings at this time, the refresh rate of the display panel 10 is required to be at least 180 Hz to ensure that the refresh rate of each timing is not less than 30 Hz and prevent the image flicker during viewing.

It should be understood that in this embodiment, based on the arrangement in which the first pixel island 11, the second pixel island 12, and the third pixel island 13 in the repeating unit are adjacent to one another, the size of the microlens is reduced, and therefore, the problem that the resolution degradation of 2D image display is also alleviated even without time division multiplexing.

Described above are merely exemplary embodiments of the present disclosure, and are not intended to limit the present disclosure. Within the spirit and principles of the present disclosure, any modifications, equivalent substitutions, improvements, and the like are within the protection scope of the present disclosure.

What is claimed is:

1. A display device, comprising a display panel and a microlens array disposed on a light-emitting side of the display panel, wherein the display panel comprises a plurality of pixel islands, and the microlens array comprises a plurality of microlens units in one-to-one correspondence with the plurality of pixel islands;

wherein an orthographic projection of each of the microlens units on the display panel is coincident with or disposed within a region where a corresponding pixel island is disposed; and each of the pixel islands comprises a plurality of sub-pixels arranged in an array, wherein the sub-pixels in a same pixel island display a same color, and the plurality of pixel islands comprise a first pixel island displaying a first color, a second pixel island displaying a second color, and a third pixel island displaying a third color, the first pixel island, the second pixel island, and the third pixel island adjacent to one another forming a repeating unit;

wherein in a same repeating unit, a first sub-pixel in the first pixel island, a second sub-pixel in the second pixel island, and a third sub-pixel in the third pixel island are disposed at three vertexes of a triangle respectively, wherein the first sub-pixel, the second sub-pixel, and the third sub-pixels are disposed at same positions respectively relative to the microlens unit corresponding to the first pixel island, the microlens unit corresponding to the second pixel island, and the microlens unit corresponding to the third pixel island.

2. The display device according to claim 1, wherein in the same repeating unit, the first sub-pixel in the first pixel island, the second sub-pixel in the second pixel island, and the third sub-pixel in the third pixel island are disposed at three vertexes of an isosceles triangle respectively.

3. The display device according to claim 1, wherein the pixel island and the microlens unit are both in a rectangular shape.

4. The display device according to claim 3, wherein in each of the pixel islands, the number of sub-pixels in a length direction is 2k, and a ratio of the number of sub-pixels in the length direction to the number of sub-pixels in a width direction is 2i:1, wherein k is an integer greater than or equal to 2, and i is an integer greater than or equal to 1.

5. The display device according to claim 4, wherein the length direction is parallel to an extension direction of a grid line.

6. The display device according to claim 1, wherein a pitch P of the microlens unit is determined according to a width Px of the sub-pixel, a preset binocular pupil distance T and the number N of sub-pixels included in each of the pixel islands, wherein the pitch P is calculated by the following formula:

$$P=(N \times T \times Px)/(T+Px).$$

7. The display device according to claim 1, wherein a curvature radius r of the microlens unit is determined according to a width Px of the sub-pixel, a preset binocular pupil distance T, the number N of sub-pixels included in each of the pixel islands, and a preset viewing distance L, wherein the curvature radius r is calculated by the following formula:

$$r=(Px \times L \times (N-1))/T.$$

8. The display device according to claim 1, wherein a distance h between the microlens unit and the display panel is determined according to a width Px of the sub-pixel, a preset binocular pupil distance T, and a preset viewing distance L, wherein the distance h is calculated by the following formula:

$$h=(L \times Px)/T.$$

9. The display device according to claim 1, wherein a thickness d of the microlens unit is determined according to a refractive index n of a material of the microlens unit, a curvature radius r of the microlens unit, and a distance h between the microlens unit and the display panel, wherein the thickness d is calculated by the following formula:

$$d=n\times r/(n-1)-n\times h.$$

10. The display device according to claim 1, wherein a width w of the microlens unit is determined according to a width Px of the sub-pixel, a distance h between the microlens unit and the display panel, the number N of sub-pixels included in each of the pixel islands, and a preset viewing distance L, wherein the width w of the microlens unit is calculated by the following formula:

$$w=(L\times N\times Px)/(L+h).$$

11. The display device according to claim 1, further comprising a controlling unit and a rendering unit, wherein the controlling unit is electrically connected to the rendering unit and configured to control the rendering unit to perform image rendering, and each sub-pixel in the pixel island is electrically connected to the rendering unit.

12. A display method of a display device, applicable to the display device as defined in claim 1, the display method comprising:
    driving, in each display period, a plurality of rows of pixels included in the display device row by row for display;
    wherein each of the pixels comprises the first sub-pixel in the first pixel island, the second sub-pixel in the second pixel island, and the third sub-pixel in the third pixel island in the same repeating unit.

13. The display method according to claim 12, wherein the each display period comprises a plurality of timings, wherein pixels displayed by driving in any two timings are different and multiplex a sub-pixel in at least one of the pixel islands.

14. The display method according to claim 13, wherein the each display period comprises 2m, or 3m, or 6m timings, wherein m is a positive integer greater than or equal to 1; a refresh rate of an image in each of the timings is greater than F, wherein F is a refresh rate when human eyes are incapable of perceiving image flicker.

15. The display method according to claim 14, wherein the each display period comprises a first timing, a second timing, and a third timing;
    wherein a first pixel displayed by driving in the first timing and a second pixel displayed by driving in the second timing multiplex a sub-pixel in at least one of the pixel islands, the second pixel and a third pixel displayed by driving in the third timing multiplex a sub-pixel in at least one of the pixel islands, and the first pixel, the second pixel, and the third pixel are arranged along a direction parallel to a grid line.

16. The display method according to claim 14, wherein the each display period comprises a first timing and a second timing;
    wherein a first pixel displayed by driving in the first timing and a second pixel displayed by driving in the second timing multiplex a sub-pixel in at least one of the pixel islands, and the first pixel and the second pixel are arranged along a direction parallel to a data line.

17. The display method according to claim 14, wherein the each display period comprises a first timing, a second timing, a third timing, a fourth timing, a fifth timing, and a sixth timing;
    wherein a first pixel displayed by driving in the first timing and a second pixel displayed by driving in the second timing multiplex a sub-pixel in at least one of the pixel islands, the second pixel and a third pixel displayed by driving in the third timing multiplex a sub-pixel in at least one of the pixel islands, and the first pixel, the second pixel, and the third pixel are arranged along a direction parallel to a grid line;
    a fourth pixel displayed by driving in the fourth timing and a fifth pixel displayed by driving in the fifth timing multiplex a sub-pixel in at least one of the pixel islands, the fifth pixel and a sixth pixel displayed by driving in the sixth timing multiplex a sub-pixel in at least one of the pixel islands, and the fourth pixel, the fifth pixel, and the sixth pixel are arranged along the direction parallel to the grid line;
    the first pixel and the fourth pixel multiplex a sub-pixel in at least one of the pixel islands, and are arranged along a direction parallel to a data line;
    the second pixel and the fifth pixel multiplex a sub-pixel in at least one of the pixel islands, and are arranged along the direction parallel to the data line; and
    the third pixel and the sixth pixel multiplex a sub-pixel in at least one of the pixel islands, and are arranged along the direction parallel to the data line.

18. A display method of a display device, applicable to the display device as defined in of claim 1, the display method comprising:
    driving, in each display period, a plurality of rows of pixels included in the display device row by row for display;
    wherein each of the pixels comprises the first pixel island, the second pixel island, and the third pixel island adjacent to one another, and each sub-pixel in each of the pixel islands has a same gray scale.

19. The display method according to claim 18, wherein the each display period comprises a plurality of timings, wherein pixels displayed by driving in any two timings are different and multiplex a sub-pixel in at least one of the pixel islands.

20. The display method according to claim 19, wherein the each display period comprises 2m, or 3m, or 6m timings, wherein m is a positive integer greater than or equal to 1; a refresh rate of an image in each of the timing is greater than F, wherein F is a refresh rate when human eyes are incapable of perceiving image flicker.

* * * * *